United States Patent
Lin et al.

(10) Patent No.: US 8,664,928 B2
(45) Date of Patent: Mar. 4, 2014

(54) DIGITAL POWER FACTOR CORRECTION DEVICE

(75) Inventors: Shu-Chia Lin, Taipei (TW); Wen-Yueh Hsieh, New Taipei (TW); Ching-Yuan Lin, Kaohsiung (TW)

(73) Assignee: Inno-Tech Co., Ltd., Taipei (TW)

( * ) Notice: Subject to any disclaimer, the term of this patent is extended or adjusted under 35 U.S.C. 154(b) by 79 days.

(21) Appl. No.: 13/421,847

(22) Filed: Mar. 15, 2012

(65) Prior Publication Data

US 2012/0286745 A1  Nov. 15, 2012

(30) Foreign Application Priority Data

May 13, 2011  (TW) .............................. 100116846 A

(51) Int. Cl.
*G05F 1/00* (2006.01)
(52) U.S. Cl.
USPC .............................. 323/283; 323/211; 307/12
(58) Field of Classification Search
USPC ............ 323/205–211, 267, 283, 282; 363/89; 307/12
See application file for complete search history.

(56) References Cited

U.S. PATENT DOCUMENTS

2008/0284400 A1* 11/2008 Oettinger et al. ............. 323/283
2012/0287687 A1* 11/2012 Lin et al. ......................... 363/95

* cited by examiner

*Primary Examiner* — Gary L Laxton
*Assistant Examiner* — Kyle J Moody

(57) ABSTRACT

A digital power factor correction device is provided, which is an all-digital control module. The digital power factor correction device includes a voltage loop control unit, an input power control unit, a current loop control unit, and a pulse width modulation generation unit, to perform power factor correction for minimizing the phase difference between input current and input voltage through adjusting input current with an external driver and a switch unit. The voltage loop control unit and the current loop control unit contain a proportion-integral-differentiation controller to form a voltage control loop and a current control loop, respectively. The input power control unit adjusts current waveform according to the input power, while the pulse width modulation generation unit determines the stop time of pulse width modulation to produce a pulse width modulation signal, to control the external driver and the switch unit for eliminating loading effect.

6 Claims, 6 Drawing Sheets

DIGITAL POWER FACTOR CORRECTION DEVICE

BACKGROUND OF THE INVENTION

1. Field of the Invention

The present invention generally relates to a digital power factor correction device, which utilizes a digital voltage loop control unit and a current loop control unit to form a two loop control mechanism and achieve a function of power factor correction.

2. The Prior Arts

The phase of input current of a power supply is different from the phase of power supply voltage due to non-linear characterization of the loading, the power factor decreases and leads to power wasting accordingly. Thus a power factor correction device is needed for establishing power factor correction to decrease necessary transmitting voltage-current of power equipment, reduce imaginary power and increase real power, and further to decrease harmonics wave interference and improve quality of power supply.

In conventional art, a power factor correction (PFC) functions by theoretically approximating input voltage waveform through adjusting input current waveform for reducing or eliminating the phase difference between current and voltage waveforms. Usually this design uses a voltage loop or current loop to control current according to loading variation. However, this design with analog circuit implementation for PFC function induces noise interference easily and, therefore, affect stability and efficiency of real operation. In addition, this kind of design lacks the simultaneous use of voltage loop and current loop for exploiting more stable control mechanism.

Therefore, it is desired to provide a power factor correction device utilizing two loops with a voltage loop and a current loop to solve the problems mentioned above.

SUMMARY OF THE INVENTION

A primary objective of the present invention is to provide a digital power factor correction device, which is an all-digital control module. The digital power factor correction device comprises a voltage loop control unit, an input power control unit, a current loop control unit, and a pulse width modulation generation unit, to perform power factor correction for minimizing the phase difference between input current and input voltage through adjusting input current with an external driver and a switch unit. The voltage loop control unit and the current loop control unit contain proportion-integral-differentiation controller to form a voltage control loop and a current control loop, respectively. The input power control unit adjusts current waveform according to the input power, while the pulse width modulation generation unit decides the stop time of pulse width modulation to produce a pulse width modulation signal, to control the external driver and the switch unit.

Therefore, the digital power factor correction device of the present invention is capable of improving power factor and reducing effeteness of input power supply with loading variation, and is suitable for improving different power supplies, i.e., power supply of computer, server, LCD TV/monitor, or DC motor.

The foregoing and other features, aspects and advantages of the present invention will become better understood from a careful reading of a detailed description provided herein below with appropriate reference to the accompanying drawings.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION OF THE PREFERRED EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems consistent with aspects related to the invention as recited in the appended claims.

Figure 1:
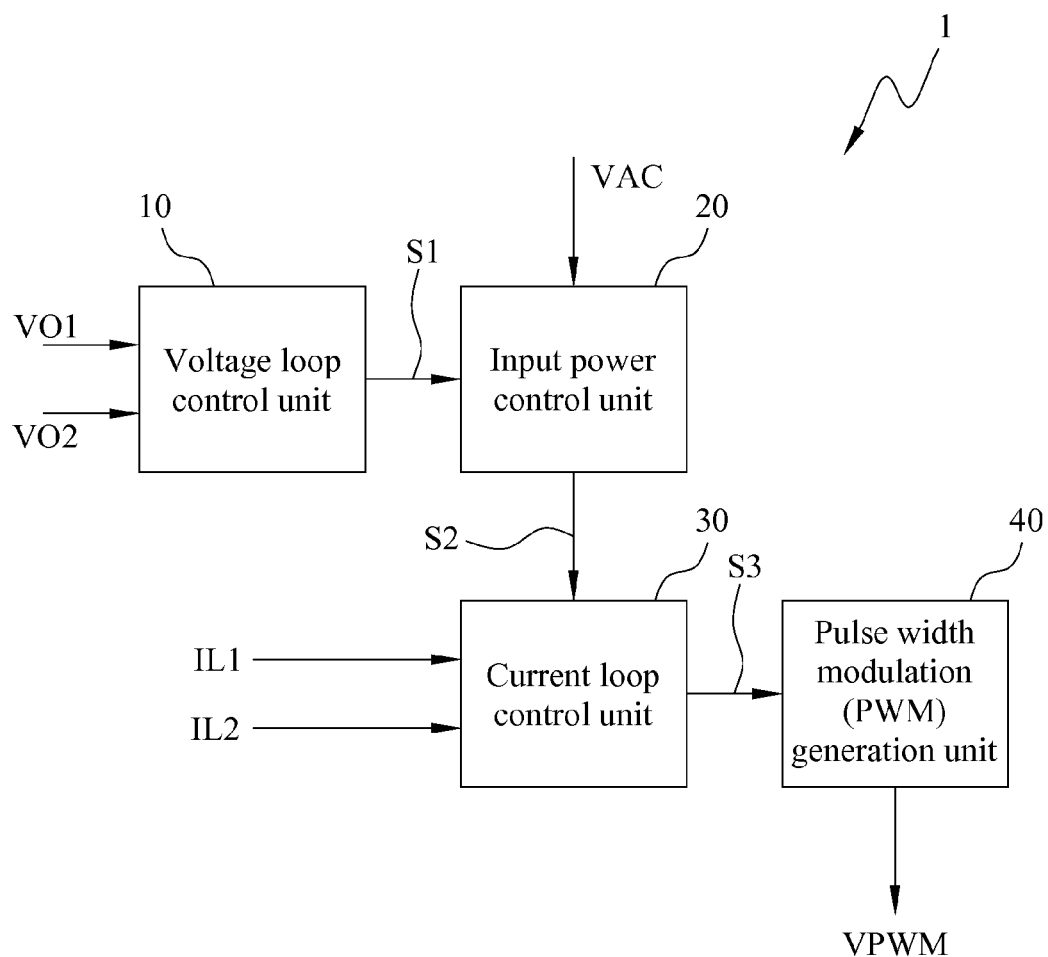
FIG. 1 illustrates a digital power factor correction device according to an embodiment of the present invention.

FIG. 1 illustrates a digital power factor correction device according to an embodiment of the present invention. Referring to FIG. 1, the digital power factor correction device includes a voltage loop control unit 10, an input power control unit 20, a current loop control unit 30, and a pulse width modulation (PWM) generation unit 40, wherein all units are implemented by digital design, i.e., there are no analog circuits in the digital power factor correction device of the present invention.

In this embodiment, the voltage loop control unit receives a first loading voltage VO1 and a second loading voltage VO2 to produce a first signal S1. The input power control unit 20 receives the first signal S1 and an external input power voltage VAC to produce a second signal S2. The current loop control unit 30 receives the second signal S2, a first input current I1, and a second input current I2 to produce a third signal S3. The PWM generation unit 40 receives the third signal S3 to produce pulse width modulation (PWM) signal VPWM.

Figure 2:
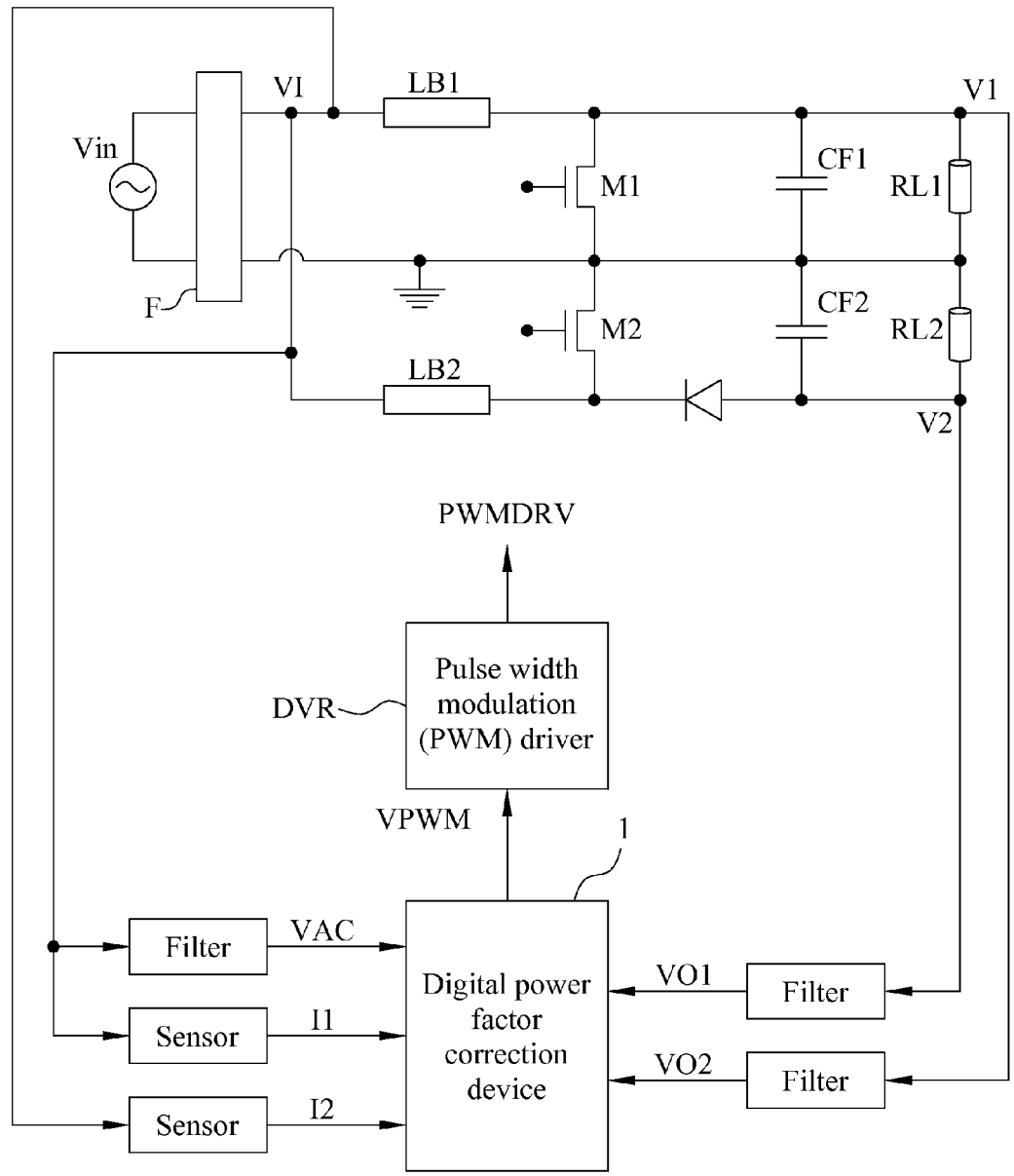
FIG. 2 illustrates an exemplary application of the digital power factor correction device according to the embodiment of the present invention.

FIG. 2 illustrates an exemplary application of the digital power factor correction device according to an embodiment of the present invention. Referring to FIG. 2 for illustrated more detail, an external power voltage Vin, such as an alternating-current (AC) power voltage supplied from a power company, may process filtering through an electromagnetic interference (EMI) filter F to produce an input filtered power voltage VI, and further produce a first output voltage V1 and a second output voltage V2 by using a first power inductance LB1, a second power inductance LB2, a first driving transistor M1, a second driving transistor M2, a rectifier diode D, a first power capacitor CF1, and a second power capacitor CF2, in order to provide power to a first loading device RL1 and a second loading device RL2, respectively. Another exemplary embodiment may use no EMI filter F, i.e., the input filtered power voltage V1 is the original external power voltage Vin.

In this embodiment, the digital power factor correction device 1 is coupled with a plurality of filter and a plurality of sensor to transfer the input filtered power voltage VI, the first input voltage V1, and the second voltage V2 into the needed external input power voltage VAC, the first input current I1, the second input current I2, the first loading voltage VO1, and the second loading voltage VO2, and produce PWM signal VPWM, and further produce PWM driving signal PWMDRV through a PWM driver DVR, in order to control gate terminals of the first driving transistor M1 and the second driving transistor M2 in the switch unit.

It is noted that FIG. 2 illustrates an exemplary application of the digital power factor correction device and is not used to limit the scope of the present invention.

Figure 3:
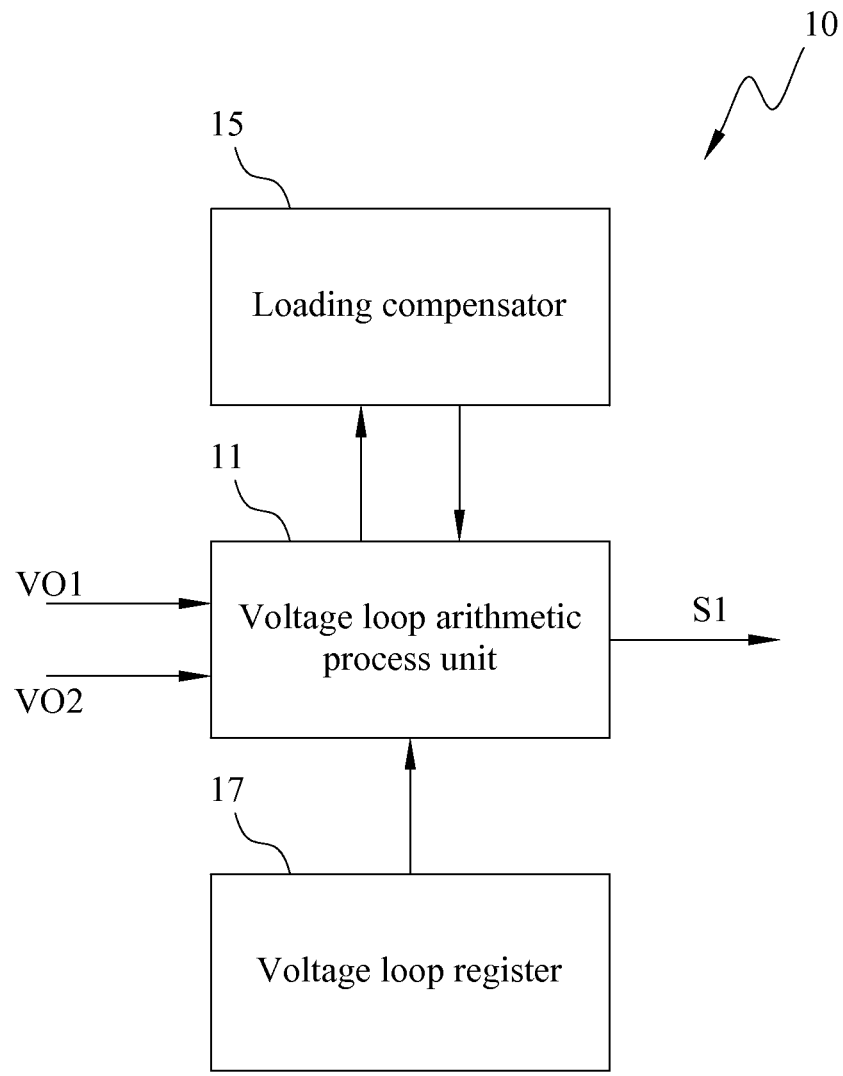
FIG. 3 illustrates a block diagram of a voltage loop control unit according to an embodiment of the present invention.

FIG. 3 illustrates a block diagram of a voltage loop control unit according to an embodiment of the present invention. Referring to FIG. 3, the voltage control unit 10 includes a voltage loop arithmetic process unit 11, a loading compensator 15, and a voltage loop register 17, wherein the voltage loop arithmetic process unit 11 receives the first loading voltage VO1 and the second loading voltage VO2 and selects one of the first loading voltage VO1 and the second loading voltage VO2 according to a selection parameter of the voltage loop register 17, and transfers the selected one to the loading compensator 15 in order to execute a loading compensation process to produce a loading compensation signal. The voltage loop arithmetic process unit 11 receives the loading compensation signal and executes the corresponding compensation control process with an embedded compensation controller (not shown) according to a voltage loop setting parameter of the voltage loop register 17 to produce the first signal S1. The compensation controller is one of proportion (P) controller, proportion-integral (PI) controller, and proportion-integral-differentiation (PID) controller.

Figure 4:
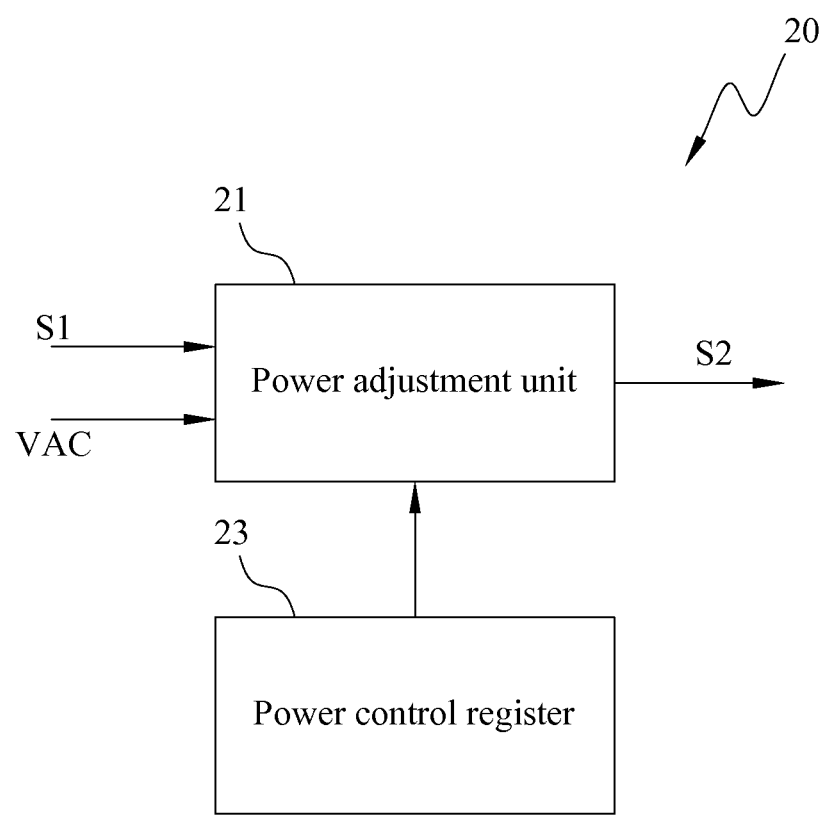
FIG. 4 illustrates a block diagram of an input power control unit according to an embodiment of the present invention.

FIG. 4 illustrates a block diagram of an input power control unit according to an embodiment of the present invention. Referring to FIG. 4, the input power control unit 20 includes a power adjustment unit 21 and a power control register 23, wherein the power adjustment unit 21 receives and does multiplication to both the first signal S1 and the external input power voltage VAC to get a current waveform, and executes an adjustment process to produce the second signal S2 according to an adjustment parameter of the power control register 23. In addition, the power adjustment unit 21 may cancel the adjustment process to directly assign the first signal S1 as the second signal S2 according to an adjustment selection setting of the power control register 23.

Figure 5:
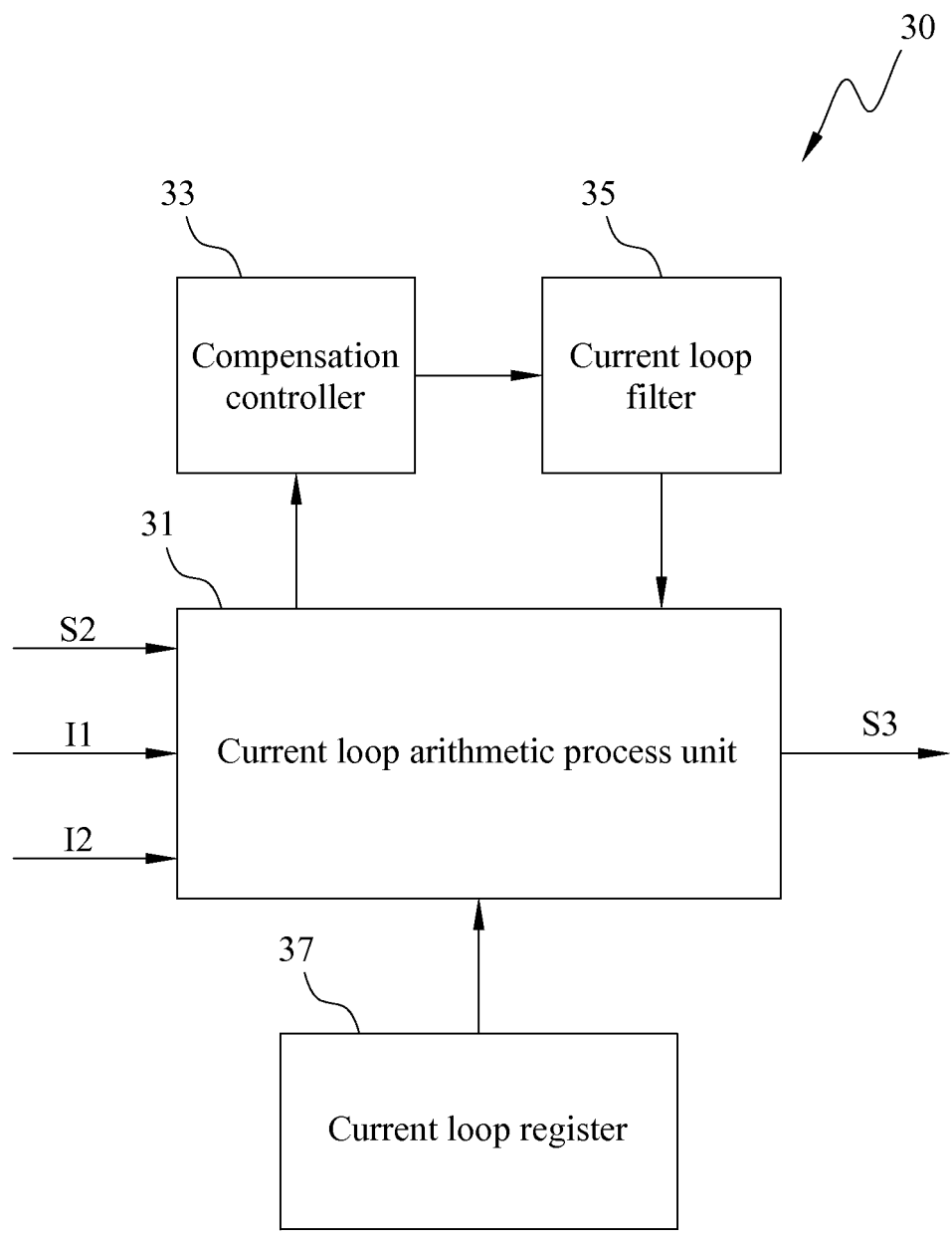
FIG. 5 illustrates a block diagram of a current loop control unit according to an embodiment of the present invention.

FIG. 5 illustrates a block diagram of a current loop control unit according to an embodiment of the present invention. Referring to FIG. 5, the current loop control unit 30 includes a current loop arithmetic process unit 31, a compensation controller 33, a current loop filter 35, and a current loop register 37. The current loop arithmetic process unit 31 receives the second signal S2, the first input current I1, and the second input current I2, and selects one of the first input current I1 and the second input current I2 according to a selection parameter of the current loop register 37 and subtracts the second signal S2 from the selected one to produce a corresponding error. The compensation controller 33 executes a corresponding compensation control process according to a current loop setting parameter of the current loop register 37 to produce a current loop compensation control signal. The current loop register 37 receives the current loop compensation control signal and executes a filtering process according to a current loop filtering parameter of the current loop register 37 to produce a current loop filtered signal, i.e., a third signal S3, which is transmitted out by the current loop arithmetic process unit 31. The compensation controller is one of proportion controller, proportion-integral controller, and proportion-integral-differentiation controller.

Figure 6:
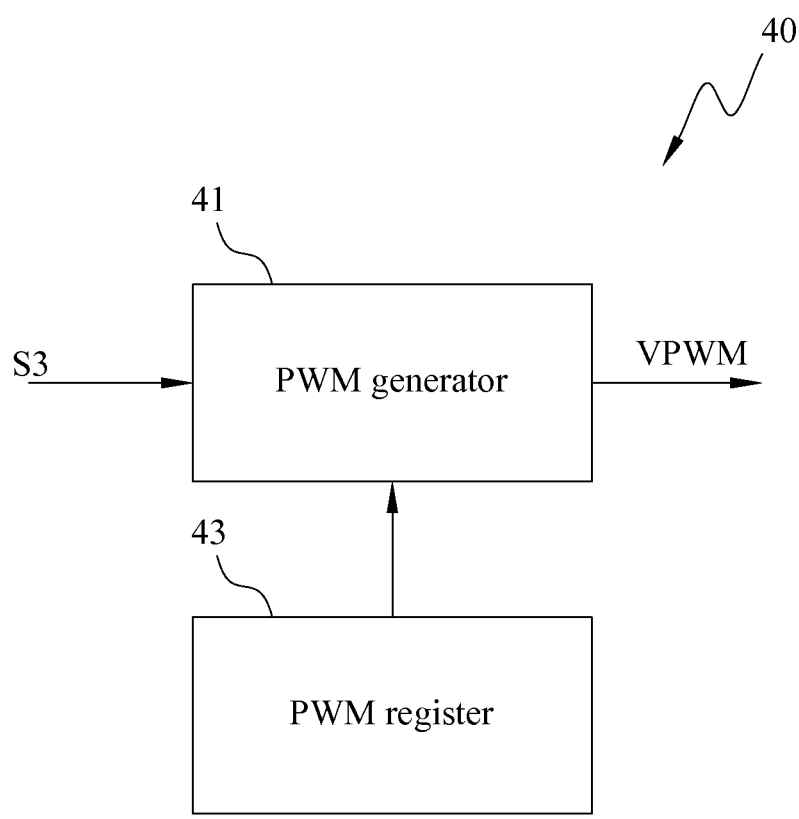
FIG. 6 illustrates a block diagram of a PWM generation unit according to an embodiment of the present invention.

FIG. 6 illustrates a block diagram of a PWM generation unit according to an embodiment of the present invention. Referring to FIG. 6, the PWM generation unit 40 includes a PWM generator 41 and a PWM register 43, wherein the PWM generator 41 receives the third signal S3 to determine the stop time of the pulse width modulation according to a stop time parameter of the PWM register 43, and executes a pulse width modulation process to produce PWM signal VPWM.

The voltage loop register 17, the power control register 23, the current loop register 37, and the PWM register 43 listed above may be implemented with combining partially to few registers or combining all to a single register.

It is noted that FIG. 3 to FIG. 6 illustrates an exemplary block diagram of the present invention and is not used to limit the scope of the present invention. Therefore, the present invention includes equivalent circuits that are capable of achieving necessary electrical function.

An advantage of the present invention is that the power factor correction device is implemented by all-digital design with high operation stability and reliability, and may reduce external noise interference dramatically.

A further advantage of the present invention is that the voltage loop control unit and the current loop control unit are utilized to sense the current and voltage respectively to form a two-loop control mechanism, and may improve system stability, increase power usage efficiency, and reduce waste.

Although the disclosure has been described with reference to the exemplary embodiments. It will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A digital power factor correction device, comprising:
    a voltage loop control unit, receiving a first loading voltage and a second loading voltage, and executing a voltage loop control process to produce a first signal;
    an input power control unit, receiving said first signal and an external input power voltage, and executing an input power control process to produce a second signal;
    a current loop control unit, receiving said second signal, a first input current, and a second input current, and executing a current loop control process to produce a third signal; and
    a pulse width modulation (PWM) generation unit, receiving said third signal, and executing a pulse width modulation process to produce a pulse width modulation signal,
    wherein said pulse width modulation signal is provided to an external pulse width modulation driver to drive an external switch unit, and further supply power to an external first loading device and a second loading device, said first loading voltage and said second loading voltage relate to a terminal voltage of said first loading device and said second loading device, respectively, said first input current and said second input current come from an external supply voltage and relate to the current of said first loading device and said second loading device, respectively, said external input power voltage is produced from an external power voltage with an electromagnetic interference (EMI) filter, or said external input power voltage is said external power voltage; and wherein said voltage loop control unit includes a voltage loop arithmetic process unit, a loading compensator, and a voltage loop register, wherein said voltage loop arithmetic process unit receives said first loading voltage and said second loading voltage and selects one of said first loading voltage and said second loading voltage according to a selection parameter of said voltage loop register, and transfers the selected one to said loading compensator so as to execute a loading compensation process to produce a loading compensation signal, said voltage loop arithmetic process unit receives said loading compensation signal and executes a corresponding compensation control process with an embedded compensation controller according to a voltage loop setting parameter of the voltage loop register to produce said first signal, and said compensation controller is one of proportion controller, proportion-integral controller, and proportion-integral-differentiation controller.

2. The digital power factor correction device as claimed in claim 1, wherein said external input power voltage is an alternating-current power voltage.

3. The digital power factor correction device as claimed in claim 1, wherein said input power control unit includes a power adjustment unit and a power control register, wherein said power adjustment unit receives and does multiplication to both said first signal and said external input power voltage to get a current waveform, and executes an adjustment process to produce said second signal according to an adjustment parameter of said power control register.

4. The digital power factor correction device as claimed in claim 3, wherein said power adjustment unit may cancel said adjustment process to directly assign said first signal as said second signal according to an adjustment selection setting of the power control register.

5. The digital power factor correction device as claimed in claim 1, wherein said current loop control unit includes a current loop arithmetic process unit, a compensation controller, a current loop filter, and a current loop register, wherein said current loop arithmetic process unit receives said second signal, said first input current, and said second input current, and selects one of said first input current or said second input current according to a selection parameter of said current loop register, and subtracts said second signal from the selected one to produce a corresponding error, said compensation controller executes a corresponding compensation control process according to a current loop setting parameter of said current loop register to produce a current loop compensation control signal, said current loop register receives said current loop compensation control signal and executes a filtering process according to a current loop filtering parameter of said current loop register to produce a current loop filtered signal, which is assigned as said third signal and is transmitted out by said current loop arithmetic process unit, and said compensation controller is one of proportion controller, proportion-integral controller, or proportion-integral-differentiation controller.

6. The digital power factor correction device as claimed in claim 1, wherein said PWM generation unit includes a PWM generator and a PWM register, wherein said PWM generator receives said third signal to determine a stop time of said pulse width modulation according to a stop time parameter of said PWM register, and executes said pulse width modulation process to produce said PWM signal.

* * * * *